Patented Aug. 18, 1936

2,051,121

UNITED STATES PATENT OFFICE 2,051,121

COMPOUNDS OF THE VIOLANTHRONE SERIES AND PROCESS FOR THEIR PRODUCTION

Alexander John Wuertz, Milwaukee, Wis., assignor to E. I. du Pont de Nemours & Company, Wilmington, Del., a corporation of Delaware No Drawing. Application May 18, 1934, Serial No. 726,331. Renewed March 18, 1936

18 Claims. (Cl. 260—44)

This invention relates to derivatives of violanthrones and their preparation. It especially appertains to the substances produced by the treatment of violanthrones with carboxylic acid halides.

It is well known by those skilled in the art that compounds known as benzanthrones are produced when compounds of the anthraquinone series are condensed with glycerine (see United States of America Patents 818,992 of April 24, 1906, and 809,892 of January 9, 1906, to Bally and Isler, and 786,085 of March 28, 1905, to Bally). When benzanthrones are fused with caustic alkali under appropriate conditions there are produced compounds known as violanthrones (see for example "Colour Index" 1099).

While the chemical structure of violanthrone is not positively known, it is generally believed to be as follows:

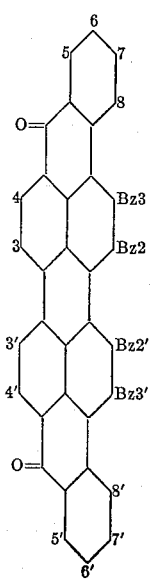

The numbers given in the formula are those usually assigned to the positions they adjoin.

Compounds having this general structure are powerful vat dyes. Since their discovery a tremendous amount of research work has been expended upon them. This work has developed the fact that two positions of such a nucleus are more reactive than the others. It is the general belief that the Bz-2, Bz-2' positions are the ones showing this particular chemical reactivity.

It has now been found that new organic chemical compounds, new vat dyes, new vat colors, new colored carbon compounds, new intermediates, new vattable compositions of matter, new violanthrone derivatives, and new monosubstituted violanthrones may be produced by reacting (or condensing) carboxylic acid halides especially the carbonyl chlorides with violanthrones having the aforementioned reactive positions free (or unoccupied).

This invention had for an object the preparation of new chemical compounds and new processes for the production of substituted violanthrones. Other objects were the preparation of a new series of carbon compounds in a very desirable physical form and in a high state of purity. Still further objects were to produce new vat dyes, new derivatives of violanthrones (particularly without resorting to special atmospheric conditions) and to devise new chemical processes. A general advance in the art and other objects which will appear hereinafter are also contemplated.

The foregoing objects and related ends are accomplished in the manner set out in the following description in which details of what is believed to be the best mode for carrying out the invention are disclosed.

Specifically one method for accomplishing the aforementioned objects and obtaining the newly discovered products is by treating violanthrones not substituted in the Bz-2, Bz-2' positions with carboxylic acid halides in the presence of aluminum chloride until one molecular proportion of the carboxylic acid halide has been condensed or reacted with one molecular proportion of the violanthrone.

The invention will be further understood by a consideration of the following detailed description and illustrative specific examples in which the quantities are given in parts by weight.

*Example I*

Into a suitable open vessel there was introduced 400–600 parts of antimony tri-chloride (anhydrous SbCl₃) and it was heated to 70–80° C., under which conditions the chloride melts. To this fluid, under agitation, was added 200–300 parts of anhydrous aluminum chloride and the mixture allowed to digest completely, (this usually requires about one-half hour at 80–100° C.). When this mixture had taken on a fluid aspect 100 parts of violanthrone were introduced into the melt and allowed to digest or uniformly disperse within the molten mass while maintaining the temperature around 90–100° C. for a period of one-half to one hour. The melt having assumed a smooth appearance there was introduced into the same 65-70 parts of 1-chloro-anthraquinone-2-carbonyl chloride at 80-100° C. After this had been added the temperature was raised to 140-150° C. over a period of one-half to one hour and maintained at this point approximately one hour in order to insure completion of the reaction. The liquid melt was poured into cold water containing 2 to 5% of hydrochloric acid. The presence of the acid prevents a precipitation of basic antimony salts. The suspension was then heated to about 75-90° C., filtered and washed free of aluminum and antimony salts.

The residual cake was purified by extraction with dilute alkali solution (carbonate, for example sodium carbonate, solutions are suitable). The product thus obtained, when in a dry form, is a dark violet powder only slightly soluble in low boiling organic solvents, soluble to a somewhat larger degree in high boiling solvents. It dissolves in sulphuric acid with a red-violet color which changes to a blue precipitate upon dilution with water. The product dissolves in an alkaline hydrosulphite vat with a bluish color, having no fluorescence. It dyes cotton in blue shades which when exposed to atmospheric oxygen change to a reddish-blue color. The product upon analysis was found to contain chlorine, indicating its probable structure to be a 1-chloro-2-anthraquinonyl-ketone derivative of violanthrone.

*Example II*

One hundred (100) parts of di-benzanthrone (violanthrone) were intimately mixed with 60 to 70 parts of 1-chloro-anthraquinone-2-carbonyl chloride and the whole introduced in 200 to 300 parts of anhydrous aluminum chloride containing 20% of dry sodium chloride. The fusion mass was then heated to 160 to 190° C., for a period of two to four hours or until the mass became so stiff as to render further agitation difficult. The fusion mass was then transferred into a large volume of ice water, heated to boiling under agitation, and the dyestuff removed by filtration. The residual product was further extracted with dilute alkali, for example sodium hydroxide, and subsequently boiled out with 4 to 5 parts of alcohol, filtered and dried. The product thus obtained was a bluish-violet powder, giving a reddish-brown to reddish-violet sulphuric acid solution. It dyes cotton from an alkaline hydro-sulphite vat in reddish-blue shades of excellent fastness. The product contains molecular chlorine and is apparently the same compound as that produced in Example I.

*Example III*

One hundred (100) parts of violanthrone were suspended in 300 to 400 parts of tri-chloro-benzene under agitation. To this suspension was added 60 to 70 parts of 1-chloro-anthraquinone-2-carbonyl chloride followed by an addition of 200-300 parts of anhydrous aluminum chloride at 60 to 80° C. The temperature was then raised to 180 to 190° C., and maintained at this level for a period of 6 to 8 hours. The fusion mass was steam distilled in order to remove the tri-chloro-benzene. The residual dyestuff was extracted with dilute hydrochloric acid followed by an extraction with dilute alkali and finally with ethyl alcohol. The dry powder of the product thus obtained is similar to the product obtained in Example II. It probably has the formula

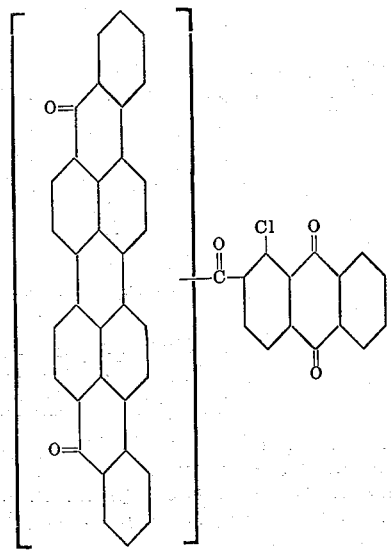

*Example IV*

One hundred (100) parts of violanthrone were intimately mixed with 60 to 65 parts of 1-chloro-2-carboxylic acid chloride of anthraquinone. This mixture was then introduced into 400 to 500 parts of anhydrous aluminum chloride containing 20% of dry sodium chloride. The whole was heated to 180 to 200° C., for a period of 6 to 8 hours. When the reaction was completed and no further hydrogen chloride was evolved the fusion mass was transferred to water and isolated in the same manner as set forth in Examples II and III. The product thus obtained was found to be similar to the products obtained in Examples I, II and III. Isomeric halo-anthraquinone-carbonyl halides behave similarly when treated in the manner set out above.

*Example V*

To a fluid melt of 400-600 parts of antimony trichloride and 200-300 parts of aluminum chloride was added 100 parts of violanthrone. This was allowed to become thoroughly incorporated in the melt at 100-120° C. This operation ordinarily takes approximately one-half to one hour. When a homogeneous melt was obtained it was cooled to 80-90° C., and while maintained at this temperature 40-50 parts of para-nitro-benzoyl chloride was added. The temperature was subsequently raised to 130-150° C. and maintained at this level for one to two hours. The fluid mass was then poured into warm water which had been previously made acid with sulphuric acid and the product was then isolated in the manner described in Example I.

*Example VI*

One hundred (100) parts of violanthrone were intimately mixed with 40 to 45 parts of para-nitro-benzoyl chloride and 200 to 300 parts of anhydrous aluminum chloride containing 20% salt (NaCl). The whole was then heated to 160-180° C., for a period of 4 to 8 hours or until no further hydrogen chloride was liberated. When the reaction was completed the whole mass was poured into ice water and the suspension boiled for about ½ to 1 hour. The dyestuff was then filtered off and subsequently extracted with hot dilute alkaline solution, followed by an extraction with hot ethyl alcohol. The dyestuff thus obtained contains nitrogen in the form of a nitro-group. By virtue of this nitro-group it may be reduced for example by either sodium sulphide or alkaline sodium hydrosulphite to form an amino-derivative. These compounds probably have the formulae

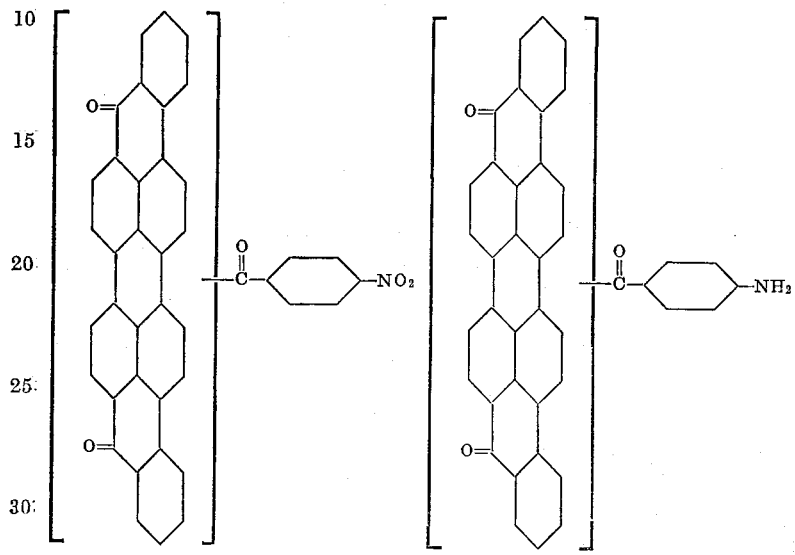

Both the nitro-body and the amino-body have a strong purple-red sulphuric acid solution and dye from an ordinary hydrosulphite vat in reddish-blue shades much brighter and redder than violanthrone. The color of the soluble vat of this new compound is an intense blue as compared with a purple fluorescence of violanthrone. Elementary analysis shows that the new compounds contain combined nitrogen.

*Example VII*

One hundred (100) parts of violanthrone were introduced into 300 to 400 parts of tri-chloro-benzene. To this suspension there was first added 40 to 45 parts of para-nitro-benzoyl chloride and then 200 to 250 parts of anhydrous aluminum chloride. The whole was then heated to 160–180° C. for about 8 to 10 hours. The fusion mass was then steam distilled in order to remove the organic solvent. The dyestuff was subsequently isolated and purified as indicated in the foregoing example. The product thus obtained was found to be similar to that obtained in Example VI.

*Example VIII*

One hundred (100) parts of violanthrone was suspended in 300 to 400 parts of tri-chloro-benzene and to this suspension was added 80 to 90 parts of para-nitro-benzoyl chloride (ratio of one mol of violanthrone to two mols of the latter) followed by an addition of 400 to 500 parts of anhydrous aluminum chloride. The whole was heated at 160–180° C., for approximately 15 to 20 hours. The fusion mass was then steam distilled and the product isolated and purified as indicated in Examples VI and VII. The product thus obtained was similar to the products of the foregoing examples. This indicates that under the conditions of operation described only one para-nitro-phenyl-ketone group is combined with the violanthrone molecule and that the excess of para-nitro-benzoyl chloride used in the example does not enter into the reaction.

*Example IX*

To a fluid melt, consisting of 400–600 parts of antimony tri-chloride and 200–300 parts of aluminum chloride in which 100 parts of violanthrone have been dissolved in the same manner as described in Example I, was added 65–70 parts of 1:9-anthrathiazol-2-carbonyl-chloride at 80–100° C., the mixture heated to 150–165° C., within the period of one to one and one-half hours and this temperature maintained for a period of 2 to 3 hours. The reaction product presumably consists of a substituted violanthrone in which one hydrogen atom is replaced by a 1:9-anthrathiazol-2-ketonic group. This compound was isolated as indicated in Example I. The product thus obtained has a yellowish-red sulphuric acid solution which when diluted with water precipitates in a greenish-blue form. It dyes from a blue non-fluorescent alkaline hydrosulphite solution in blue shades which upon drying turn to a pure blue shade. This product contains sulphur and nitrogen.

*Example X*

One hundred (100) parts of violanthrone was intimately mixed with 65 to 70 parts of 1:9-anthrathiazol-2-carbonyl-chloride and the mixture introduced into 4 to 6 parts of anhydrous aluminum chloride. The whole was then heated to 160 to 190° C., and maintained at this level until no further evolution of hydrogen chloride was perceptible. This usually takes from four to eight hours. The nearly dry mass was transferred to a large volume of cold water containing ice. The suspension was boiled under agitation for about ½ hour and directly filtered. The residual dyestuff was then boiled out with alkali and again filtered, washed alkali free and dried. The product thus obtained contains combined sulphur and nitrogen in molecular proportions, that is to say, one molecule of violanthrone has combined with one molecule of anthrathiazol-2-carbonyl chloride by an elimination of hydrogen chloride to produce a substituted violanthrone, probably having the formula

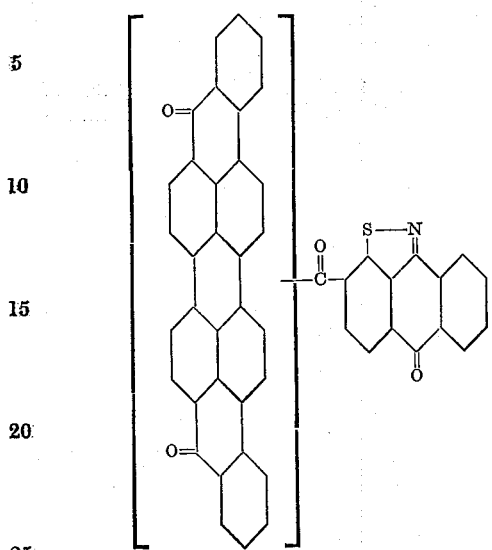

*Example XI*

One hundred (100) parts of violanthrone was suspended in 300 to 400 parts of tri-chloro-benzene. To this suspension was added 65 to 70 parts of 1,9-anthrathiazol-2-carbonyl chloride followed by an addition of 200 to 350 parts of aluminum chloride. The whole was slowly heated to 160 to 190° C., and maintained at this temperature level from 10 to 15 hours, or until no further hydrogen chloride was evolved. The charge was then transferred to a still and the solvent removed by steam distillation. The residual coloring matter was then filtered off and further purified by extraction with dilute alkali and finally hot alcohol. The product thus obtained corresponds to the product obtained in Example X in every respect.

Isomeric compounds behave similarly when treated according to the procedures described in the foregoing examples. Particular mention may be made of 1,9-anthrathiazol-4-carbonyl-chloride, 1,9-anthrathiazol-5-carbonyl-chloride, meta-nitro-benzoyl-chloride, ortho-nitro-benzoylchloride, 3-chloro - anthraquinone - 2-carbonyl chloride, 1-chloro-anthraquinone - 4 - carbonyl chloride, 1-chloro-anthraquinone-6-carbonyl chloride and 1-chloro-anthraquinone-7-carbonyl chloride.

As will be obvious to those skilled in the art the invention is not limited to the utilization of the particular carbonyl halides disclosed in the specific examples or their isomers. Special mention may be made of such other compounds as 1,9-anthraselenazol-2-carbonyl chloride, 1,9-anthraselenazol-4-carbonyl chloride, 1,9-anthraselenazol-5-carbonyl chloride, 1,9-anthrathiophene-2-carbonyl chloride, 1,9-anthrathiophene-4-carbonyl chloride, 1,9-anthrathiophene-5-carbonyl chloride, ortho-chloro-benzoyl chloride, benzoyl chloride, benzoyl bromide, para-nitro-benzoyl bromide, chloro-benzoyl bromides, benzoyl chloride, para-brom-benzoyl chloride, alpha-naphthoyl chloride, beta-naphthoyl chloride, anthraquinone-2-carbonyl chloride, anthraquinone-1-carbonyl chloride, 1-nitro-anthraquinone-6-carbonyl chloride, 1-nitro-anthraquinone-2-carbonyl chloride, phthaloyl chloride, succinyl chloride, oxalyl chloride, para-methyl-benzoyl chloride, acetyl chloride, butyric acid chlorides, and their analogs and homologs.

The catholicity of the invention is apparent from the preceding description and specific examples. In addition to the carbocyclic carbonyl halides, examples of which have been set out above, compounds having acyclic and heterocyclic nuclei attached to the carboxyl radical are also especially suitable for the reactions utilized in this invention. If desired compounds whose nuclei involve a plurality of such types of structure may be satisfactorily used. Aromatic compounds such as those of the benzene, naphthalene, anthracene and phenanthrene series are deserving of special mention. The condensed ring compounds of the naphthalene and anthraquinone series are especially desirable. The carbonyl chlorides of the benzene and naphthalene series are quite advantageously used. Furthermore, it will be clear to those familiar with the vat dye art that other substituents than those specifically mentioned may be attached to the nuclei of the carbonyl halide compounds.

Whenever compounds are produced containing a nitro group, it will be understood that these may be reduced to the corresponding amino compounds in which state they are rendered suitable for further condensations.

The amount of antimony tri-chloride or other metal halide used as an adjuvant in the aluminum chloride melt may be varied over a wide range or omitted entirely. The addition (even in substantial proportions) of other metal salts such as sodium chloride, zinc chloride and ferric chloride (particularly those of metals exhibiting more than one valence) to the melt for the purpose of producing proper fluidity, viscosity, melting point and other physical and/or chemical conditions and reactions, may be made if found expedient. From this and the specific examples, it will be clear that it is not necessary for the aluminum tri-chloride used to be of high purity.

The condensing agents disclosed in this invention may influence the orientation of the substituted groups in the resultant condensation product.

Antimony chloride is a particularly desirable adjuvant. It is a solid at ordinary temperatures (temperatures up to 70–80° C.). When in a fluid state above 70° C. this chloride is apparently capable of forming a solution or an eutectic mixture with aluminum chloride. The latter chloride is a solid body below 150–180° C. at which temperature it tends to sublime when heated by itself. A mixture of 3 to 5 parts of antimony tri-chloride and 1 to 2 parts of aluminum chloride (based upon 1 part of violanthrone) when heated together to 80–100° C. form a fluid melt in which violanthrone dissolves readily. When this dyestuff is introduced into such a melt and allowed to dissolve or disperse within said melt, and when to the resultant solution or dispersion, the compounds desired to be condensed with violanthrone, are introduced a reaction ensues at a relatively low temperature (100–160° C.). The melt during such reaction maintains a fluid appearance. In some instances the condensations are complete within a short period of time for instance a fraction of an hour. When the reactions are complete the condensing agents of this invention permit the reaction mass to be handled with great ease.

The temperature limits set forth in the foregoing examples are capable of wide variation without harmful change in results. Ordinarily the temperature range of 60–200° C. for the condensation is preferred. Temperatures outside this range may be used at the sacrifice of time and/or yield of product. The temperatures for producing homogeneity in the melt and for drowning the fusion are not especially significant and depend upon the convenience of the person carrying out the reaction.

Time limits are likewise elastic and no detriment to the products has been noted after prolonged heating in the reaction melt.

As shown in the above examples, the condensations in the presence of anhydrous aluminum chloride may be carried out either with or without a solvent. Suitable solvents include those mentioned in the above examples, such as, tri-chloro-benzene, and nitro-benzene as well as similar organic compounds, for example, tri-chloro-ethylenes and tetra-chloro-ethylenes.

The proportions of the reactants may be widely varied without apparently affecting the results. An excess of either reactant remains in the melt when the reaction is complete and may be removed from the final product by suitable means. The reactant present in the least molecular proportion is substantially quantitatively consumed during the reaction. Any excess of violanthrone may be separated from the condensation product by virtue of a diverse solubility in such solvents as concentrated sulphuric acid, organic solvents and alkaline hydrosulfite solutions. Any excess of the other reactants may be removed by suitable expedients for example, extraction with organic solvents or aqueous alkaline solutions.

The reactions involved in this invention may be carried out in vessels of various compositions for example, glass, enamel, cast iron and steel are suitable.

The exact change taking place in the violanthrone molecule during the treatment with the carbonyl halide is not known. It is believed that a condensation product in which the violanthrone nucleus is linked through its Bz-2 position to the carbonyl halide body with which it was reacted, is produced. The chemical analyses of the products indicate that the residual groups of the carbonyl halide remain intact and that only one group is substituted, indicating, therefore, that the resultant products are mono derivatives of violanthrone most likely mono-aryl-ketonic derivatives. However, it is not desired to limit the invention to any particular theory and the above explanation is given only for the purpose of aiding in understanding the invention.

The term "dispersing" in the claims is used to cover dissolving as well as the usual process known as dispersing.

The invention or discovery has numerous advantages as will be apparent to those skilled in the art. As outstanding among these there may be mentioned the production of a new series of vat dyes and vattable products which are very stable. New and important colored compounds, coloring matters and intermediates are now made available for the art.

I claim:

1. In the process of preparing new derivatives of violanthrone the step which comprises condensing only one molecular proportion of a carbonyl-halide with a violanthrone whose Bz-2, Bz-2' positions are unoccupied.

2. The process of claim 1 when the condensation is carried out in an open vessel.

3. The process of claim 1 when the condensation is carried out in the presence of aluminum chloride and a solvent.

4. The process of claim 1 when the condensation is carried out in the presence of aluminum chloride in an open vessel.

5. The process which comprises condensing a carbonyl-halide with a violanthrone whose Bz-2, Bz-2' positions are unoccupied in the presence of aluminum chloride and antimony chloride.

6. The product which is substantially identical with that obtainable by suspending 100 parts of violanthrone in 300 parts of tri-chloro-benzene, adding 60 parts of 1-chloro-anthraquinone-2-carbonyl-chloride, adding 200 parts of aluminum chloride having a temperature of 60° C., raising the temperature to 180° C., maintaining the reaction mass at this last named temperature for 6 hours, steam distilling off the tri-chloro-benzene, extracting the residue with dilute hydrochloric acid and extracting the resultant with ethyl alcohol, which is a bluish-violet solid giving reddish-brown to reddish-violet sulfuric acid solutions, dyeing cotton reddish-blue shades of excellent fastness from a bluish non-fluorescent alkaline hydrosulfite vat, and which is believed to have the formula:

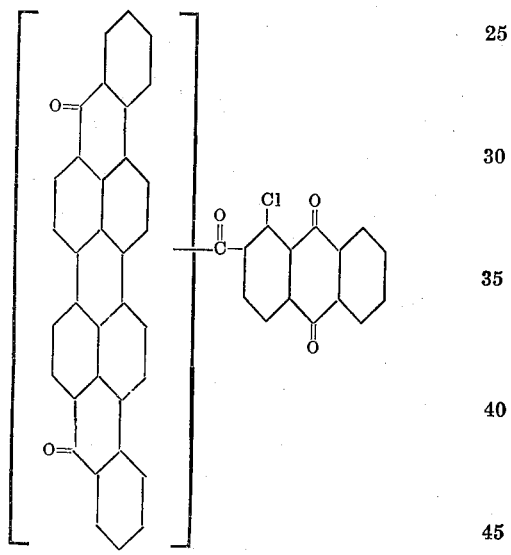

7. The vat colors obtainable by condensing a violanthrone not substituted in the Bz2, Bz2' positions with only one molecular proportion of a carbonyl halide in the presence of aluminum chloride.

8. The process comprising heating violanthrone and 1-chloro-anthraquinone-2-carbonyl-chloride in the presence of antimony tri-chloride and aluminum chloride.

9. The process comprising heating violanthrone and 1,9-anthrathiazol-2-carbonyl-chloride in the presence of antimony tri-chloride and aluminum chloride.

10. The vat colors of claim 9 when the carbonyl halide is a halo-anthraquinone-carbonyl halide.

11. The process comprising heating violanthrone and para-nitro-benzoyl-chloride in the presence of antimony tri-chloride and aluminum chloride.

12. The process which comprises mixing antimony tri-chloride and aluminum chloride, rendering the mixture liquid, dispersing therein violanthrone, thereafter adding to the resultant an organic carboxylic acid chloride, maintaining the temperature of the mass at a value sufficient to allow condensation of the violanthrone and organic acid compound until the condensation has taken place and thereafter separating the condensation product.

13. The compounds having the general formula:

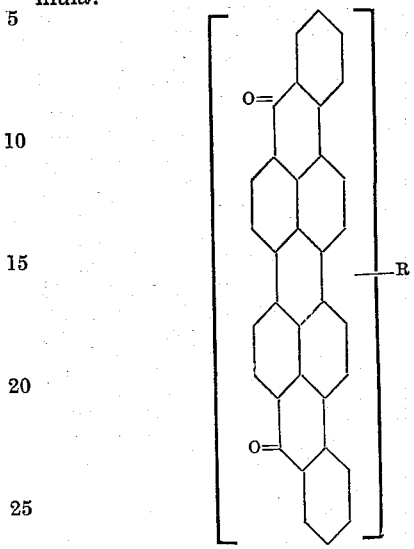

in which R is the radical of a carbonyl halide which has been condensed with violanthrone.

14. The process comprising condensing violanthrone with a carbonyl chloride of the group, nitro-benzoyl-chloride, 1-chloro-anthraquinone-2-carbonyl-chloride and 1,9-anthrathiazol-2-carbonyl-chloride.

15. The process comprising condensing violanthrone with a carbonyl chloride of the group, nitro-benzoyl-chloride, 1-chloro-anthraquinone-2-carbonyl-chloride and 1,9-anthrathiazol-2-carbonyl-chloride, in the presence of aluminum chloride.

16. The process comprising condensing violanthrone with a carbonyl chloride of the group, nitro-benzoyl-chloride, 1-chloro-anthraquinone-2-carbonyl-chloride and 1,9-anthrathiazol-2-carbonyl-chloride, in the presence of aluminum chloride and a solvent.

17. The vat colors obtainable by condensing violanthrone with only one molecular proportion of 1,9-anthrathiazol-2-carbonyl-chloride in the presence of aluminum chloride.

18. The vat colors obtainable by condensing violanthrone with only one molecular proportion of para-nitro-benzoyl-chloride in the presence of aluminum chloride.

ALEXANDER JOHN WUERTZ.

CERTIFICATE OF CORRECTION.

Patent No. 2,051,121. August 18, 1936.

ALEXANDER JOHN WUERTZ.

It is hereby certified that error appears in the printed specification of the above numbered patent requiring correction as follows: Page 4, second column, line 3-4, for "heretocyclic" read heterocyclic; page 5, second column, line 61, claim 10, for the claim reference numeral "9" read 7; and that the said Letters Patent should be read with these corrections therein that the same may conform to the record of the case in the Patent Office.

Signed and sealed this 8th day of December, A. D. 1936.

(Seal)

Henry Van Arsdale
Acting Commissioner of Patents.